Oct. 17, 1950     C. F. ROBERTS     2,526,275
CULINARY IMPLEMENT
Filed Aug. 5, 1946
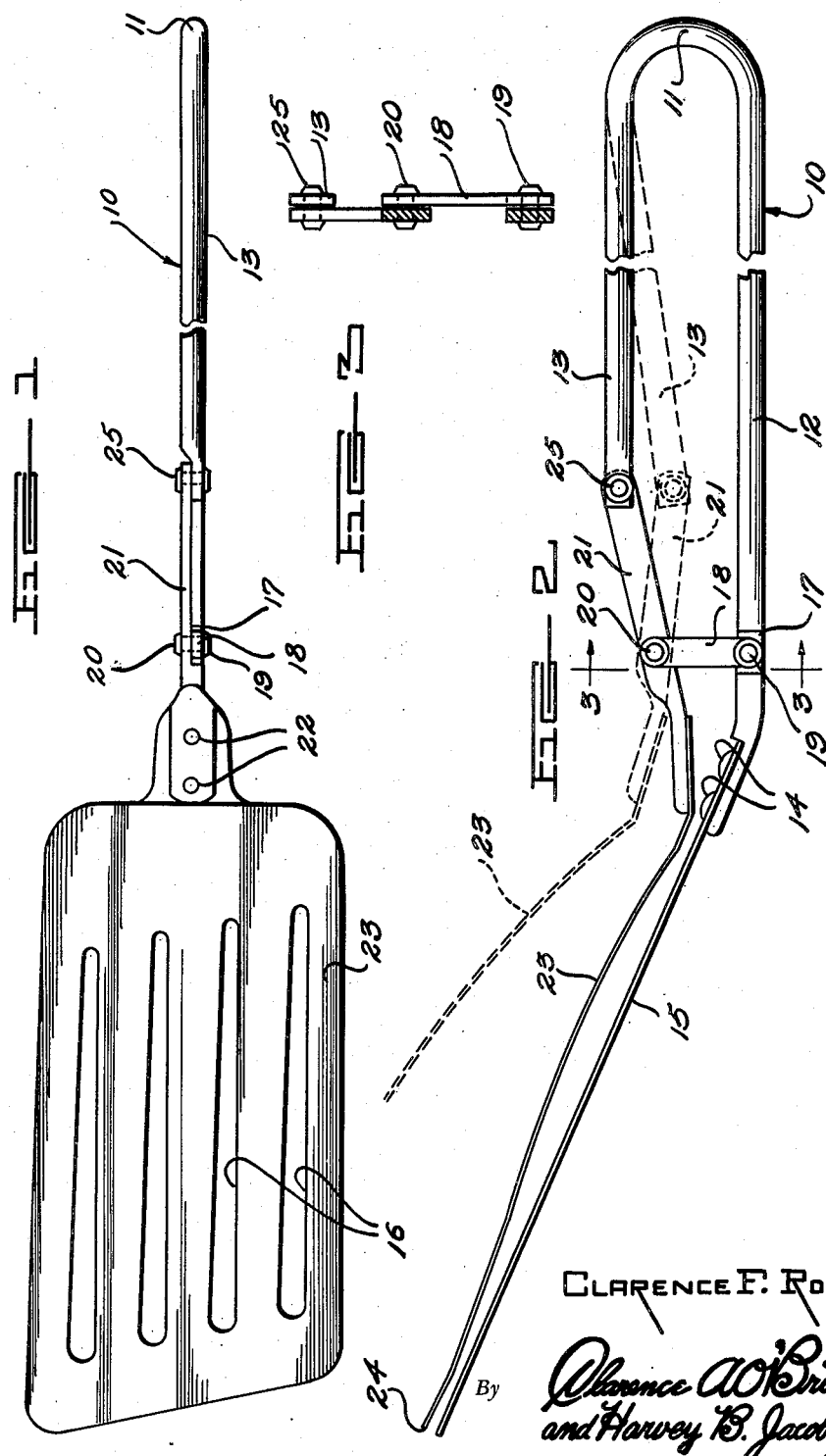
Inventor
CLARENCE F. ROBERTS
By *Clarence A. O'Brien and Harvey B. Jacobson*
Attorneys

Patented Oct. 17, 1950

2,526,275

UNITED STATES PATENT OFFICE 2,526,275

CULINARY IMPLEMENT

Clarence F. Roberts, Chicago, Ill., assignor of one-third to Ernest Buckly, Chicago, Ill.

Application August 5, 1946, Serial No. 688,565

1 Claim. (Cl. 294—7)

This invention relates to a culinary implement and more particularly to a spatula or pancake turner.

The primary object of the invention is to avoid the splashing and spattering of hot grease when it is desired to turn an egg, pancake or the like being fried therein.

Another object is to enable the foodstuff being prepared to be turned without lifting the spatula.

The above and other objects may be attained by employing this invention which embodies among its features a spring wire handle comprising a single piece of spring wire bent intermediate its ends to form a pair of spaced yielding arms adapted to be gripped in the hand of the user, a spatula blade secured to the free end of one of said arms, a fulcrum between the blade and the opposite end of said arm, a lever pivoted to the fulcrum and to the opposite arm and a spatula blade fixed to the lever for movement through an arc concentric with the pivot point of the lever.

In the drawings,

Figure 1 is a plan view of a spatula embodying the features of this invention,

Figure 2 is a side view of Figure 1, and

Figure 3 is a sectional view taken substantially along the line 3—3 of Figure 2.

Referring to the drawings in detail the handle of my spatula designated generally 10 is formed of a single piece of spring wire bent back upon itself at 11 to form a pair of spaced arms 12 and 13 which are adapted to be sprung toward one another as suggested by the dotted lines in Figure 2. Attached to the free end of the arm 12 as by attaching screws or rivets 14 is a spatula blade 15 formed of a relatively thin piece of sheet metal, and provided with longitudinally spaced drainage slots or openings 16 in the conventional manner. Formed in the arm 12 near its junction with the spatula blade 15, and extending in a plane perpendicular to the plane of the blade 15 is a recess or notch 17 in which a fulcrum arm 18 is secured as by a rivet 19, so that the arm 18 extends perpendicular to the axis of the arm 12.

Pivotally connected at 20 to the upper end of the fulcrum arm 18 is a lever 21 mounted to rock about an axis perpendicular to the longitudinal axis of the arm 12 and attached as by rivets 22 to one end of the lever 21 is a spatula blade 23, which like the blade 15 is formed of a piece of sheet metal and provided with longitudinally extending spaced parallel drainage slots 16 which align with the drainage slots 16 in the spatula blade 15. Unlike the spatula blade 15, the blade 23 is arched intermediate its ends so that when it is at rest its forward edge 24 will lie against the forward edge of the blade 15 and form in effect, a thin edge which may readily be introduced beneath the foodstuff which is being processed. The end of the lever 21 opposite that carrying the spatula blade 23 is pivotally connected as at 25 to the free end of the arm 13 so that when the arms 12 and 13 are returned toward one another the lever 21 will be oscillated about its pivot 20 to lift the spatula blade 23 as suggested by the dotted lines in Figure 2.

In use, it will be understood that as the spatula is advanced toward the foodstuffs being processed in the heated fat or grease, pressure is exerted on the arm 13 to cause the upper blade 23 to move away from the lower blade 15. With the foodstuff resting on the lower blade, the pressure on the arm 13 is released and the food will be held securely between the blades. Thereafter, the foodstuff may be lifted wholly clear of the fat or grease so that the grease may drain therefrom. The spatula may then be turned over and returned together with the retained foodstuff to the hot fat or grease, after which the handle may again be squeezed to release the foodstuff. In this way, the foodstuff being processed may be turned without spattering the grease.

While in the foregoing there has been shown and described the preferred embodiment of this invention it is to be understood that minor changes in the details of construction, combination and arrangement of parts may be resorted to without departing from the spirit and scope of the invention as claimed.

I claim:

A spatula comprising a rod of spring wire bent intermediate its ends to form a pair of spaced yielding arms movable toward and away from one another in a common plane, one of said arms being longer than the other arm, a spatula blade fixed to the end of the longer arm remote from the bend in the rod, a fulcrum fixed to the longer arm adjacent the spatula blade and extending perpendicularly therefrom in the direction of the shorter arm, a lever pivoted to the fulcrum adjacent its end remote from the longer arm to rock through an arc which lies in the common plane, a pivot connecting one end of the lever to the shorter arm and a spatula blade fixed to the end of the lever remote from its pivotal connection to the shorter arm for cooperation with the first-mentioned spatula blade in gripping foodstuffs between the blades.

CLARENCE F. ROBERTS.

REFERENCES CITED

The following references are of record in the file of this patent:

UNITED STATES PATENTS

| Number | Name | Date |
|---|---|---|
| 967,263 | Sweeting | Aug. 16, 1910 |
| 1,538,536 | Wisoff | May 19, 1925 |
| 2,357,764 | Raymond | Sept. 5, 1944 |

FOREIGN PATENTS

| Number | Country | Date |
|---|---|---|
| 20,202 | Great Britain | Sept. 20, 1904 |